United States Patent [19]

Gustavson et al.

[11] 4,324,032

[45] Apr. 13, 1982

[54] OPERATOR MEMBER ERECTION SYSTEM AND METHOD

[75] Inventors: Richard E. Gustavson, Wellesley Hills; Craig C. Selvage, Lexington; Daniel E. Whitney, Arlington, all of Mass.

[73] Assignee: The Charles Stark Draper Laboratory, Inc., Cambridge, Mass.

[21] Appl. No.: 146,344

[22] Filed: May 5, 1980

[51] Int. Cl.³ .................. B23Q 17/00; G01B 3/22; B25B 27/14; B25J 3/00

[52] U.S. Cl. .................................. 29/407; 29/464; 29/281.4; 33/169 C; 414/589

[58] Field of Search .............. 29/407, 464, 717, 281.4, 29/714; 33/169 C; 414/589

[56] References Cited

U.S. PATENT DOCUMENTS

| | | | |
|---|---|---|---|
| 3,824,674 | 7/1974 | Inoyama et al. | 29/407 |
| 3,893,217 | 7/1975 | Edmond | 29/407 |
| 3,965,562 | 6/1976 | Inoyama | 29/407 |
| 3,984,006 | 10/1976 | Takeyasu et al. | 414/589 |
| 4,098,001 | 7/1978 | Watson | 33/169 C |
| 4,155,169 | 5/1979 | Drake et al. | 33/169 C |
| 4,202,107 | 5/1980 | Watson | 33/169 C |
| 4,242,017 | 12/1980 | DeFazio | 33/169 C X |

*Primary Examiner*—Charlie T. Moon
*Attorney, Agent, or Firm*—Joseph S. Iandiorio

[57] ABSTRACT

An operator member erection system having a laterally remote center including an operator member having a longitudinal axis; support means for defining a remote center of compliance laterally spaced from a longitudinal axis of the operator member and including means for interconnecting the operator member with support means for enabling the operator member to move about a remote center to vary the orientation of the operator member longitudinal axis relative to the support means as the operator member moves between an extended and a retracted position; and an insertion system which utilizes the operator member erection system in combination with a remote center compliance device.

28 Claims, 17 Drawing Figures

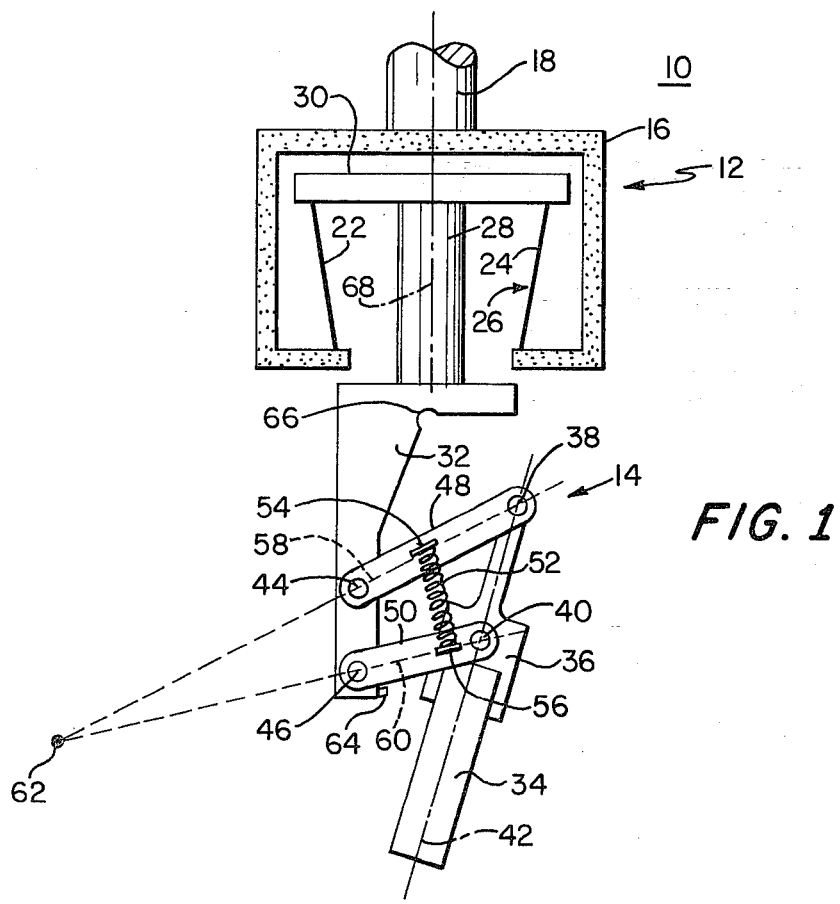
FIG. 1
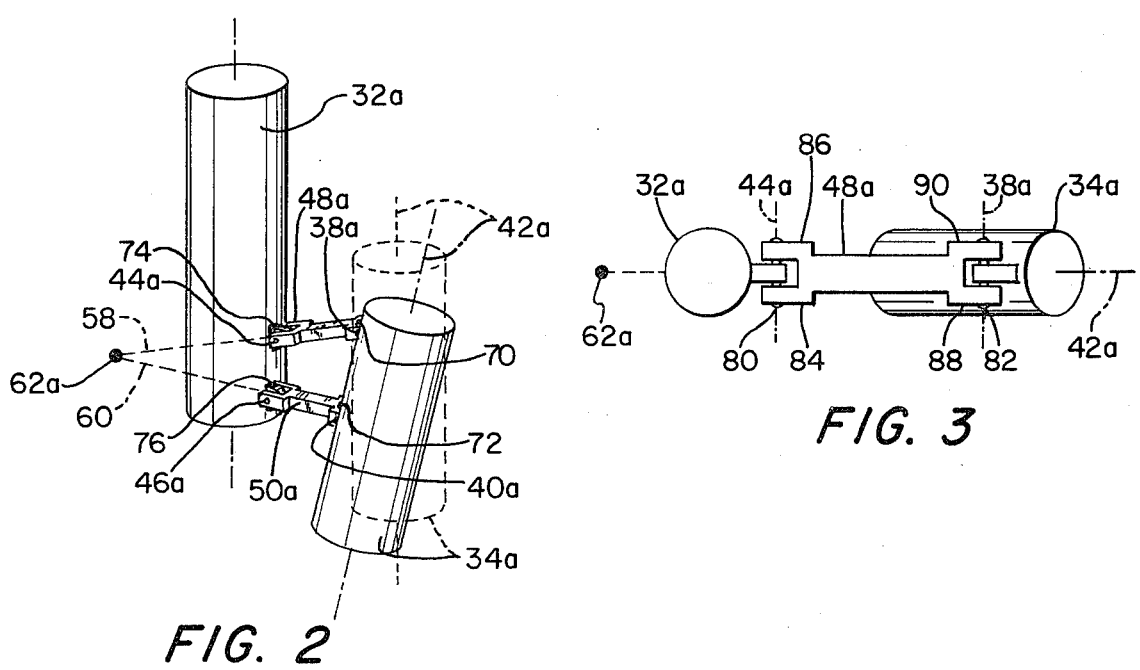
FIG. 2
FIG. 3

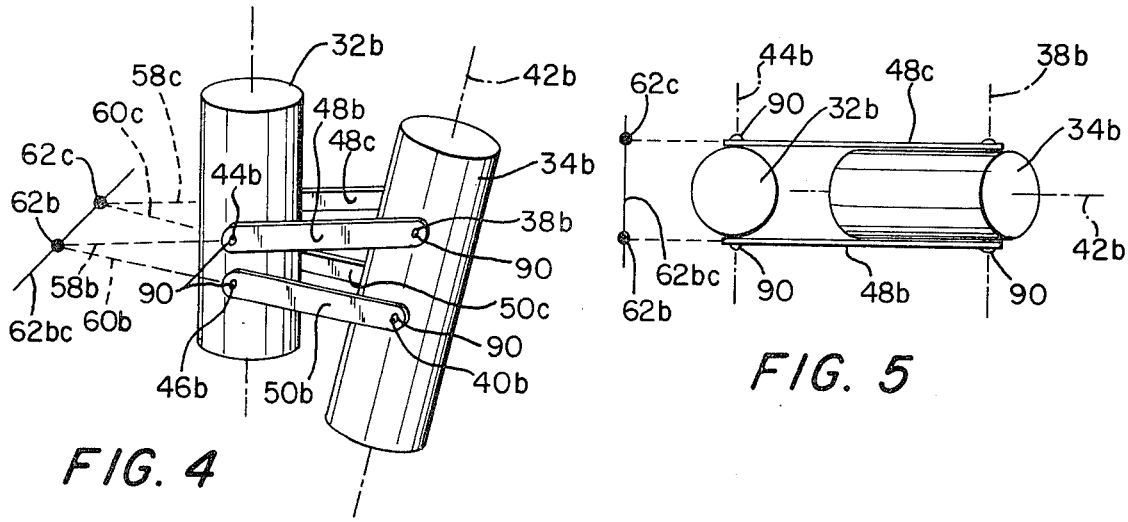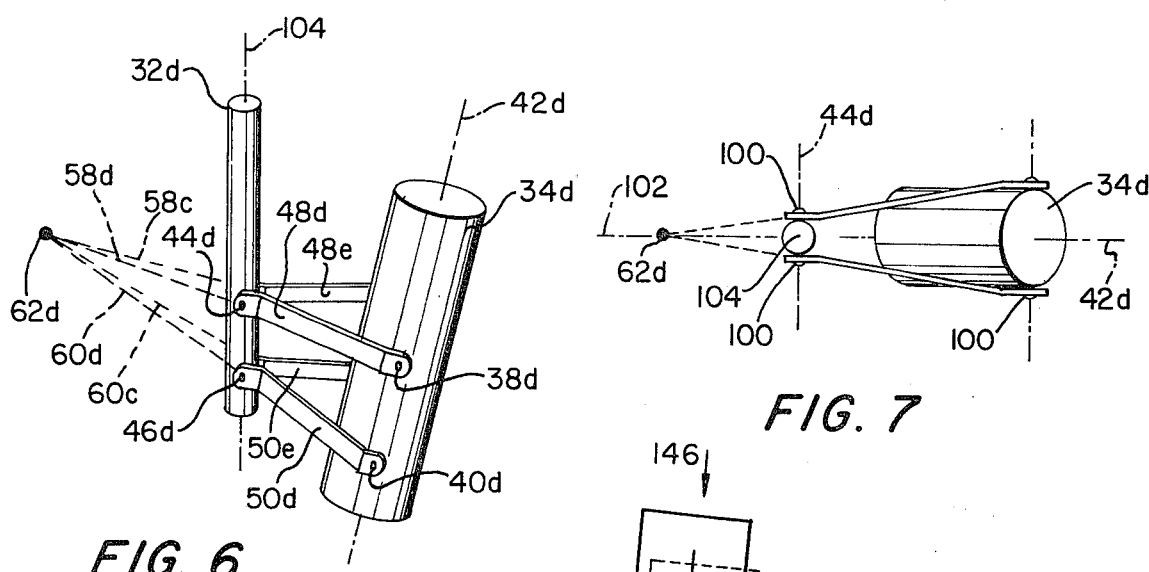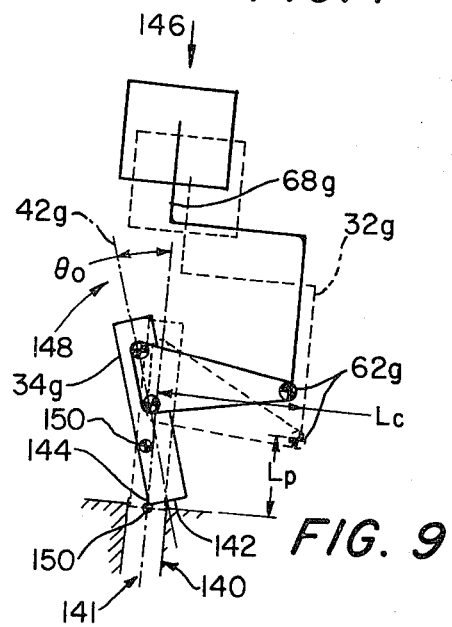

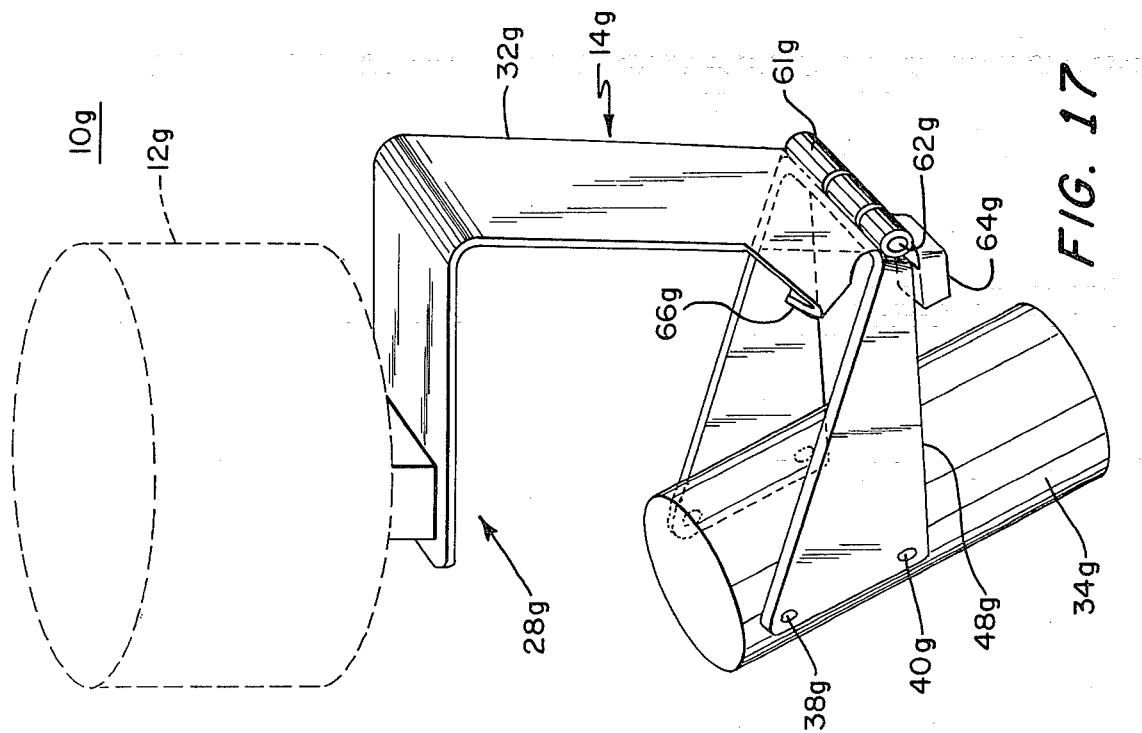
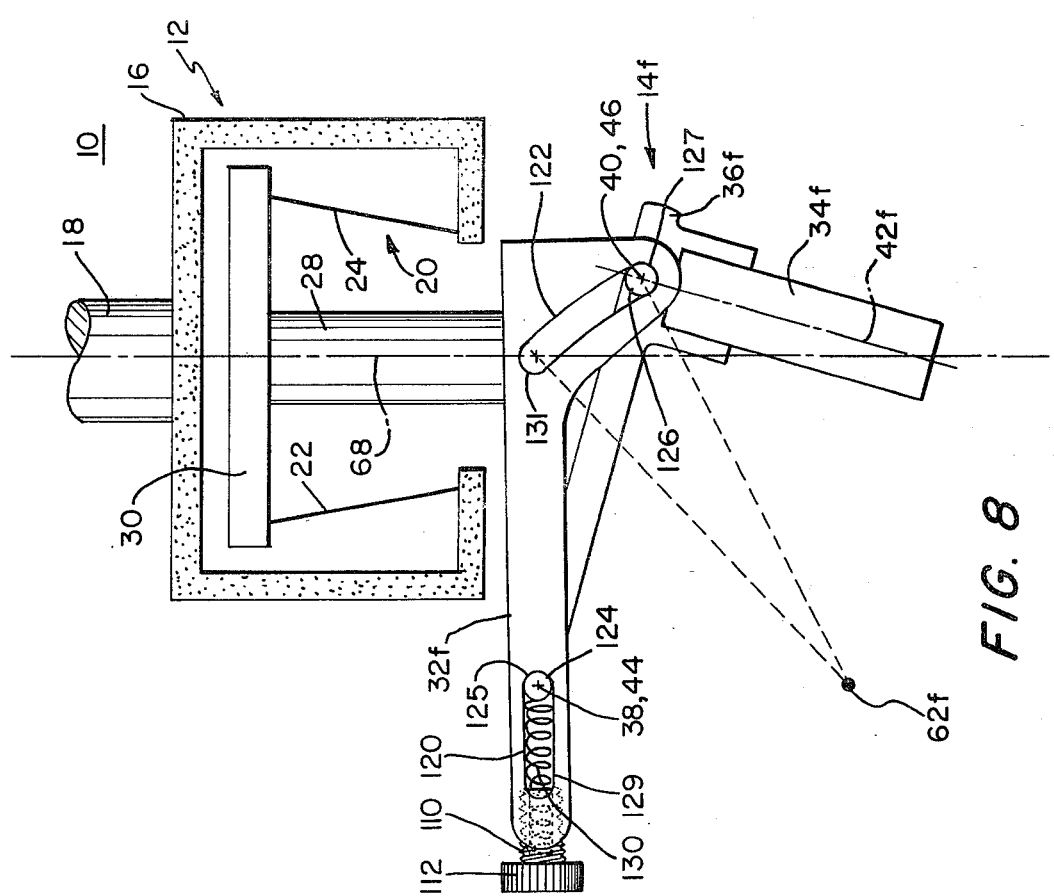

OPERATOR MEMBER ERECTION SYSTEM AND METHOD

FIELD OF INVENTION

This invention relates to an operator member erection system and more particularly to an insertion system using such an operator member erection system in combination with a remote center compliance device (RCC) such as disclosed in U.S. Pat. Nos. 4,098,001 and 4,155,169.

BACKGROUND OF INVENTION

The mating or insertion of a rod or peg with a hole is a common industrial task which people perform with ease and machines perform with difficulty. If either the peg or the hole are bevelled or chamfered the task is easier but if there is no chamfer the need for precise alignment makes it quite difficult. The necessary alignment precision may be too costly to achieve, making automation of such operations impractical. An insertion with chamfers has the same difficulty and geometric description as one without chamfers if the initial lateral misalignment between peg and hole is much larger than the chamfer. Two classes of devices which ease automated chamfered insertion are the remote center compliance device (RCC), see U.S. Pat. Nos. 4,098,001 and 4,155,169; and the Hi-Ti-Hand. See U.S. Pat. Nos. 3,824,674 and 3,984,006. The RCC alone has not yet achieved chamferless insertion. The Hi-Ti-Hand can perform chamferless insertion as well, but it does so slowly. Also, it is a complex electromechanical device.

SUMMARY OF INVENTION

It is therefore an object of this invention to provide an improved, simplified, extremely effective, passive, operator member erection system.

It is a further object of this invention to provide an improved, simplified insertion system using such an operator member erection system in combination with a remote center compliance device (RCC).

The invention results from the realization that an improvement in ease and certainty of initial engagement of a chamferless peg and hole can be achieved by an erection system which initially presents the peg at an incline to the hole and then permits the peg to rotate upwardly about a laterally remote center until the peg is generally aligned with but barely inserted into the hole, and the further realization that such a system can be combined with an RCC so that the erection system is a part of the operator member of the RCC; when the erection is complete the peg or operator member of the erection system acts as the operator member of the RCC with the remote center of the RCC proximate the tip of the operator member of the erection system for complete insertion of the erected peg (or hole) into the hole (or peg).

For uniformity throughout this disclosure the operator member is illustrated and referred to as the protruding part, or rod. This is not a necessary limitation of the invention as the operator member may be a chamferless cup or other recessed form which combines with a chamferless peg. Typically the operator member includes a gripper or claw for assembly tasks so that the part can be released after engagement.

The invention features an operator member erection system having a laterally remote center. There is an operator member with a longitudinal axis and support means for defining a remote center of compliance laterally spaced from the longitudinal axis of the operator member. The support means includes means for interconnecting the operator member with the support member for enabling the operator member to move about a remote center to vary the orientation of the operator member longitudinal axis relative to the support member as the operator member moves between an extended and a retracted position.

In a preferred embodiment, the operator member erection system is combined with a remote center compliance device (RCC), and the operator member of the erection system functions as the primary operator member. The primary operator member has a longitudinal axis and at least first and second spaced mounting axes on the operator member. There is a support means which functions as a part of the intermediate operator member. The support means defines a remote center of compliance laterally spaced from the longitudinal axis of the primary operator member. The support means includes a support member and means for interconnecting the first and second mounting axes on the primary operator member with the support member for enabling the operator member to move about a remote center, to vary the orientation of the primary operator member longitudinal axis relative to the support member as the primary operator member moves between an extended and a retracted position. This enables the primary operator member longitudinal axis to align in the retracted position with the intermediate operator member longitudinal axis and define the remote center of the remote center compliance device proximate the tip of the primary operator member.

The support member may include first and second spaced mounting axes, and the means for interconnecting may be pivotably connected to the first and second mounting axes on the operator and support members. The first and second mounting axes on the support member may be spaced apart a different distance than are the first and second mounting axes on the operator member. The interconnection axis of the first mounting axes may be non-parallel to the interconnection axis of the second mounting axes, and define a focus where they converge. The means for interconnecting may include at least a first link for interconnecting the first mounting axes and a second link for interconnecting the second mounting axes. Alternatively, the means for interconnecting may include a first pair of links for interconnecting the first mounting axes at two spaced points and a second pair of links for interconnecting the second pair of mounting axes at two spaced points.

The interconnecting axes of the first pair of links may be non-parallel and generally converge at the same focus. The means for interconnecting may be pivotably interconnected with the mounting axis at each of the operator and support members or may be deformable elements and be fixed to those mounting axes.

In alternative configurations, the support member may include first and second stop means for limiting motion of the operator member about the lateral remote center between an extended position in which the longitudinal axis of the operator member intersects with the longitudinal axis of the support member, and a retracted position in which the longitudinal axis of the operator member is generally parallel to the longitudinal axis of the support member.

The means for interconnecting may include a follower on one of the members and a slot on the other for interconnection of the first mounting axes, and a similar arrangement of a follower on one and a slot on the other for interconnection of the second mounting axes.

The operator member erection system may include a simple hinge with its fulcrum at the laterally remote center or may include a second RCC.

The invention also features a method of engaging an operator member, carried by a support member, with a part, including moving the operator member toward the part with the longitudinal axis of the operator member non-parallel to that of the part. The operator member is then initially engaged with the part. The support member is next moved toward the part to cause the operator member to rotate about a remote center laterally spaced from the longitudinal axis of the support member to erect the operator member with its longitudinal axis generally aligned with that of the part. Further rotation of the operator member is restricted, and it is fixed in the erected position engaged with the part.

With the support member carried by an RCC the erected operator member has a remote center of compliance proximate the end of the operator member, and the RCC and support member may be moved toward the part to complete engagement.

DISCLOSURE OF PREFERRED EMBODIMENT

Other objects, features and advantages will occur from the following description of a preferred embodiment and the accompanying drawings, in which:

FIG. 1 is a diagram of an erection system according to this invention combined with a remote center compliance device (RCC) to form an insertion system according to this invention;

FIG. 2 is an axonometric view of a portion of an alternative form of erection system according to this invention;

FIG. 3 is a plan view of the erection system of FIG. 2;

FIG. 4 is an axonometric view of a portion of another form of erection system according to this invention;

FIG. 5 is a plan view of the erection system of FIG. 4;

FIG. 6 is an axonometric view of yet another form of erection system according to this invention;

FIG. 7 is a plan view of the erection system of FIG. 6;

FIG. 8 is a diagram similar to FIG. 1 illustrating an alternative form of an erection system combined with a remote center compliance device;

FIG. 9 is a schematic illustration of an operator member beginning to enter a chamferless hole and illustrating the angle and distances which should be considered in constructing an erection system according to this invention;

Figure 14:
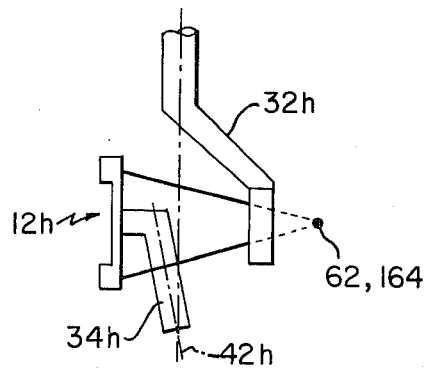
Figure 15:
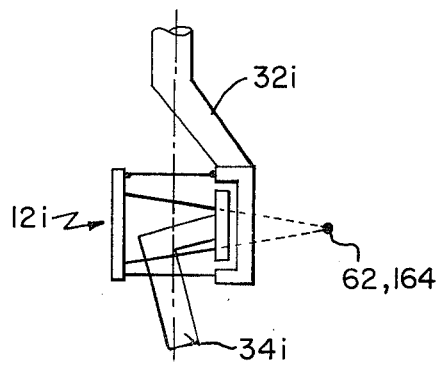
Figure 16:
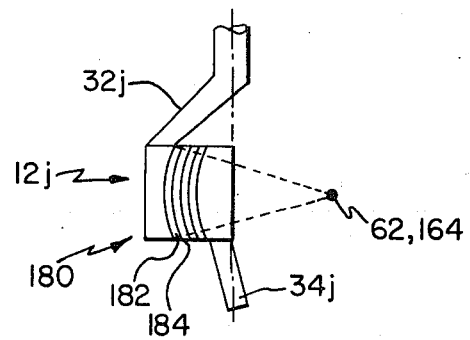

FIGS. 10, 11, 12, and 13 illustrate the sequence of operation of an insertion system including a remote center compliance device (RCC) and erection system according to this invention;

FIGS. 14, 15, and 16 are schematic illustrations of remote center compliance devices (RCC's) modified to conform to the erection system according to this invention; and FIG. 17 is an axonometric view of an insertion system according to this invention illustrating a simple hinge erection system and an RCC in phantom.

The invention may be accomplished by an insertion system including a remote center compliance device (RCC) and an operator member erection system. The erection system functions as a part of an intermediate operator member carried by the remote center compliance device (RCC). The erection system includes its own primary operator member having a longitudinal axis and may include at least first and second mounting axes on the operator member. Support means define a remote center of compliance laterally spaced from the longitudinal axis of the operator member. The support means includes a support member and means for interconnecting the first and second mounting axes on the operator member with the support member for enabling the operator member to move about a remote center to vary the orientation of the operator member longitudinal axis relative to the support member as the operator member moves between an extended and a retracted position.

In one embodiment the support member includes first and second spaced mounting axes and the means for interconnecting are pivotably connected to the first and second mounting axes on the operator and support members. Typically the mounting axes on the support member are spaced apart at a different distance than the first and second mounting axes on the operator member, and the interconnection axes between the first axes on each member and the second axes on each member are not parallel to each other but converge at a point or focus laterally displaced from the longitudinal axis of the operator member. The mounting axes may be directly on the operator member or on an extension thereof. The means for interconnecting may include a solid component with salient portions to interconnect to the mounting axis or may consist of separate parts. For example the means for interconnecting may be a pair of links, one for interconnecting the first axes and a second for interconnecting the second axes. Alternatively, the means for interconnecting may include a first pair of links, which are spaced from each other, each of which interconnects with the first axes on each of the members, the links being spaced from each other and independently interconnecting the first axis on one member with the first axis on the other. The second pair of links may be similarly arranged. The first pair of links may be parallel to each other and the second pair of links may be parallel to each other, while the first pair and the second pair are non-parallel to each other. The pairs may be non-parallel, and the links may be non-parallel within each pair so that all the links converge at a focal point laterally remote from the longitudinal axis of the operator member.

However constituted, as a single member or as two or more links or sets of links, the means for interconnecting may either be pivotally attached at the mounting axes to effect the rotation of the operator member relative to the support member, or they may be fixed at those mounting axes but may themselves be sufficiently deformable to permit the necessary rotation of the operator member. If the means for interconnecting is fixedly attached but deformable, or pivotally attached with some slack, the operator member erection system may be compliant in two dimensions instead of just one. Various other mechanisms may be used to effect the rotation about a laterally remote center. For example, the means for interconnecting the first axes on each of the members, as well as the means for interconnecting the second axes on each of the members, may include a slot on one member with a follower on the other.

There is shown in FIG. 1 an insertion system 10 including a remote center compliance device (RCC) 12 such as shown in U.S. Pat. No. 4,155,169, and an operator member erection system 14. RCC 12 includes housing 16 attached to machine ground or a robot arm by some means such as rod 18, and a deformable structure formed of three deformable beams 22, 24, and 26 (26 is hidden behind the intermediate operator member 28) which is supported by a second deformable structure 30.

Erection system 14 includes a support member 32, which forms a part of intermediate operator member 28, and a primary operator member 34. Primary operator member 34 includes an extension 36 on which are located first mounting axis 38 and second mounting axis 40 spaced along longitudinal axis 42. Support member 32 also includes a first mounting axis 44 and a second mounting axis 46 spaced apart some distance.

The first and second mounting means are interconnected by some means, for example links 48 and 50, resiliently engaged by means of spring 52 attached at 54 and 56 to links 48 and 50, respectively. Link 48 interconnects first mounting axes 38 and 44, while link 50 interconnects second mounting axes 40 and 46. The distance between mounting axes 38 and 40 is larger than that between mounting axes 44 and 46. The interconnection axis 58 of link 48, and the interconnection axis 60 of link 50, are not parallel but converge at a focal point 62 laterally remote from the longitudinal axis 42 of primary operator member 34 and provide a laterally remote center of rotation about which operator member 34 rotates. A stop or detent 64 is provided at the bottom of support member 32 to set the limit position of primary operator member 34 in the extended position where longitudinal axis 42 of primary operator member 34 intersects with the longitudinal axis 68 of intermediate operator member 28. A similar stop structure 66 sets the limit position for primary operator member 34 in the retracted position, wherein the longitudinal axis 42 of primary operator member 34 is generally parallel to the longitudinal axis 68 of intermediate operator member 28.

In subsequent figures, like parts have been given like numbers and similar parts like numbers accompanied by successive lower case letters. Although mounting axes 38 and 40, FIG. 1, are shown spaced along and intersecting with longitudinal axis 42, this is not a necessary constraint, for as shown in FIGS. 2 and 3, links 48a and 50a may be attached at mounting axes 38a, 40a, 44a, and 46a by means of lugs 70, 72 extending from operator member 34a and lugs 74, 76 on support member 32a. As indicated more clearly with respect to link 48a in FIG. 3, each of links 48a and 50a are attached to their mounting axes by means of pins 80 and 82 which extend through arms 84, 86 and arms 88, 90, respectively.

When a pair of links 48b, 48c, FIGS. 4 and 5, are used to interconnect first mounting axes 38b, 44b, and a second pair of links 50b, 50c are used to interconnect mounting axes 40b and 46b, the converging interconnecting axis 58b, 60b of links 48b and 50b meet at focus 62b while the interconnection axes 58c and 60c converge at focus 62c, illustrating that the center of rotation actually is extended to the form of a line 62bc. Links 48bc and 50bc are fastened at their respective mounting axes by means of pins 90.

Although as shown in FIG. 5 link 48c is parallel to link 48b and link 50c is parallel to link 50b, this is not a necessary limitation of the invention. For example, as shown in FIGS. 6 and 7, a pair of links 48d and 48e which interconnect first axes 38d and 44d are not parallel to each other and links 50d and 50e, which interconnect mounting axes 46d and 40d, are not parallel to each other. Rather, each of those pairs converge with respect to each other and meet at focus 62d to provide a remote center laterally displaced from the axes 42d of operator member 34d. Links 48d,e and 50d,e are fastened at mounting axes 38d, 44d by means of pins 100 as indicated in FIG. 7.

In FIGS. 1–7 the various links may be pivotably fastened to the mounting axes to permit relative rotation or may be fixed to those mounting axes and the links may be sufficiently deformable to permit the necessary relative rotation. Typically, in constructions such as depicted in FIGS. 1, 2, 3, 6, and 7, the focus 62 lies generally in the plane 102, FIG. 7, which contains the longitudinal axis 42 of operator member 34 and the longitudinal axis 104 of the support member. Also in FIGS. 1–7 the lateral remote center 62 is not fixed but moves about with respect to the support member during extension and retraction of the operator member.

In an alternative construction, erection system 14f, FIG. 8, may include a cantilevered support member 32f at the end of which is a stud 110 and handle 112, and operator member 34f having a lateral extension 36f. In erection system 14f the first mounting axes 38 and 44 coincide, as do second mounting axes 40 and 46. The means for interconnecting include slots 120, 122 on support member 32f, and followers 124, 126 on operator member extension 36f. A bias spring 130 is attached to follower 124, and operator member 34f rotates about remote center 62f between its extended position, illustrated in FIG. 8, where it is limited by the stop provided by the lower end of slot 122 and where longitudinal axis 42f intersects with longitudinal axis 168; and the retracted position established by the upper end 131 where longitudinal axis 42f is generally parallel to longitudinal axis 168. The extended position is established by the ends 125 and 127 of the two slots 120 and 122, while the retracted position is established by the other ends 129 and 131 of those slots. Although slot 120 is straight and slot 122 is arcuate, this is not a necessary limitation of the invention: either one can be straight and the other arcuate, or both may be straight or arcuate. In FIG. 8, too, the lateral remote center 62f is not fixed.

Figure 10:
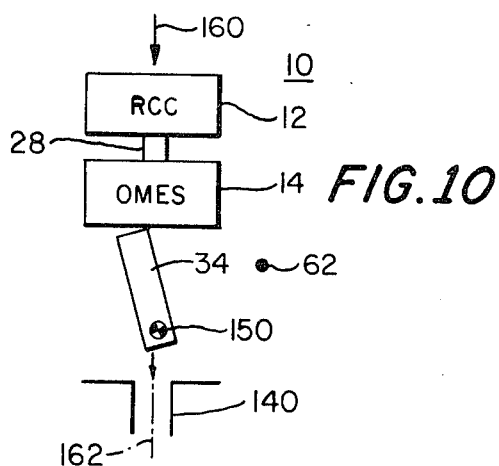

In operation, FIG. 10, a force or motion 160 is applied to remote center compliance device (RCC) 12 and moves it along with erection system 14 and operator member 34 toward hole 140. The remote compliance center established by remote center compliance (RCC) 12 and the erected operator member 34 is indicated at 150. The laterally displaced remote center established by operator member erection system 14 is indicated at 62.

Figure 11:
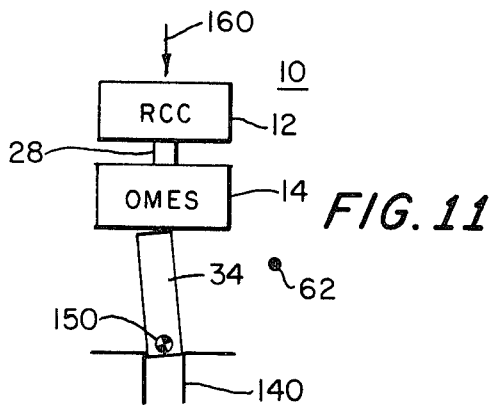
Figure 12:
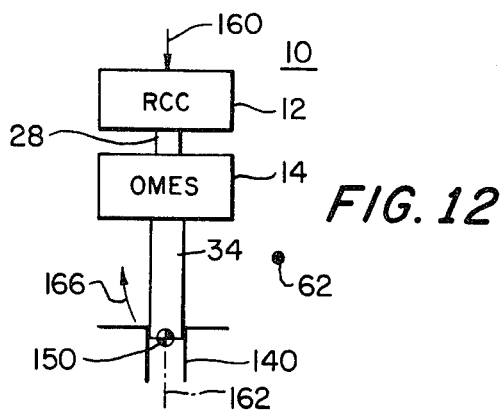

Continued motion in the direction of arrow 160, FIGS. 11 and 12, causes operator member 34 to contact the hole mouth and rotate as indicated by arrow 166 about laterally displaced remote center 62 to its fully retracted position where the axis of operator member 34 is generally aligned with axis 162 of hole 140.

Figure 13:
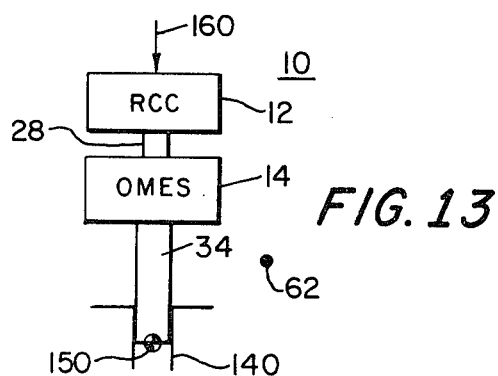

Finally, with operator member 34 in a fully erected position against its retracted stop, the remote compliance center 150 is established proximate the end of operator member 34 and the remote center compliance device 12 performs the final alignment function to permit the operator member 34, FIG. 13, to fully enter hole 140.

The engineering principles which govern the basic design and operation of the erection system are illustrated in FIG. 9. Support member 32g is shown schematically linked to operator member 34g via lateral compliance center 62g. In the extended position, operator member 34g is inclined by angle $\theta_0$ relative to axis 68g of support 32g. The lateral remote center 62g is located a distance $L_c$ to the right of axis 42g of operator 34g and upward from tip 142 of operator member 34g an amount $L_p$ (measured when operator member 34g is in the retracted position).

In operation, operator member 34g is placed in the extended position. This puts tip 142 of operator member 34g near axis 68g of support member 32g. Axis 68g of support member 32g is then located approximately parallel to and coincident with axis 141 of hole 140. RCC 12g and support member 32g are next moved along axis 68g (arrow 146) until point 142 is near the mouth of hole 140 and edge 144 of operator member 34g is just inside the hole mouth for initial engagement. Subsequently RCC 12g and support 32g are further pushed along axis 68g to complete engagement. Contact between operator member 34g and hole 140 causes the operator member 34g to rotate about lateral remote center 62g in the direction of arrow 148. During erection, RCC 12g, support 32g, lateral remote center 62g, and the remote center 150 of RCC 12g all move downward together a distance approximately equal to $L_c \sin \theta_0$ while operator member 34g rotates from the extended position to the retracted position, where its axis 42g is generally parallel to axis 68g of RCC 12g. Support member 32g, lateral remote center 62g and RCC center 150 are all shown in phantom in their final positions when operator member 34g is in the retracted position. During this action, point 62g and support member 32g move to the right in FIG. 9. RCC 12g absorbs this motion and simultaneously provides firm leftward contact between edge 144 of operator member 34g and the left inside wall of hole 140. To allow typical current RCC's to absorb the rightward motion, the horizontal movement should be small, typically 0.1 inch. $L_c$ at two to three inches and $\theta_0$ at five to ten degrees will provide a compact unit with little wasteful motion.

At the end of the erection phase, center 150 of RCC 12g generally coincides with tip 142 of operator member 34g so that RCC 12g now can function as described in U.S. Pat. Nos. 4,098,001 and 4,155,169.

Conventional remote center compliance devices (RCC's) may be modified in accordance with this invention to produce an erection system according to this invention which may be used alone or in combination with a conventional unmodified remote center compliance device to implement an insertion system according to this invention. For example, as shown in FIG. 14, when the operator member 34h of a remote center compliance device (RCC) such as shown in U.S. Pat. No. 4,155,169, is reformed so that it extends generally transversely, albeit at a slight inclination, to the normal longitudinal axis, it causes its remote compliance center 164 to be laterally displaced from the longitudinal axis 42h of the operator member, and thus places its remote compliance center 164 at or near the laterally displaced remote center 62. This provides a much more sophisticated accommodating compliance erection structure that provides flexibility in two axes.

Similarly, the device of U.S. Pat. No. 4,098,001 may be modified as shown in FIG. 15. In a similar fashion, compliance device 180, FIG. 16, composed of spherical laminations of rubber 182 and steel shims 184, provides a similar placement of remote compliance center 164 at or near laterally displaced remote center 62 to produce erection system 12j.

Alternatively, the insertion system 10g, FIG. 17, may include an operator member erection system RCC 12g and an operator member erection system 14g, which includes a simple hinge mechanism. Intermediate operator member 28g includes support member 32g which carries a simple hinge 61g that defines the lateral remote center 62g. Also carried by support member 32g is an upper stop for limiting the extent of motion of the primary operator member 34g in its retracted position and a lower stop 64g for limiting the motion of primary operator member 34g in its extended position. Primary operator member 34g is interconnected with support member 32g through hinge 61g by some interconnecting means such as bracket 48g, which is fixed to primary operator member at two points, axes 38g and 40g for rigidity. In system 10g the first and second axes on support member 32g are coincident at 62g and the lateral remote center is fixed.

Other embodiments will occur to those skilled in the art and are within the following claims:

What is claimed is:

1. An insertion system including an operator member erection system comprising:
    an operator member having a longitudinal axis;
    support means for defining a remote center of compliance laterally spaced from said longitudinal axis of said operator member and including a support member and means for interconnecting said operator member with said support member for enabling said operator member to move about a remote center to vary the orientation of the operator member longitudinal axis relative to said support member as said operator member moves between an extended and a retracted position.

2. The insertion system of claim 1 in which said operator member includes first and second spaced mounting axes on said operator member.

3. The insertion system of claim 2 in which said support member has first and second spaced mounting axes, said means for interconnecting being pivotably connected to said first and second mounting axes on said operator and support members.

4. The system of claim 3 in which said first and second mounting axes on said support member are spaced apart a different distance than said first and second mounting axes on said operator member.

5. The system of claim 3 in which the interconnection axis of said first mounting axes is non-parallel to the interconnection axis of said second mounting axes and defines a focus where the interconnection axes converge.

6. The system of claim 3 in which said means for interconnecting includes at least a first link for interconnecting said first mounting axes and a second link for interconnecting said second mounting axes.

7. The system of claim 3 in which said means for interconnecting includes a first pair of links for interconnecting said first mounting axes at two spaced points and a second pair of links for interconnecting said second mounting axes at two spaced points.

8. The system of claim 7 in which the interconnection axes of said first pair of links are non-parallel and generally converge at a focus and the interconnection axes of said second pair of links are non-parallel and generally converge at said focus.

9. The system of claim 1 in which said support member includes first and second stop means for limiting motion of said operator member about said lateral remote center between an extended position in which the longitudinal axis of said operator member intersects with the longitudinal axis of said support member and a retracted position in which said longitudinal axis of said operator member is generally parallel to the longitudinal axis of said support member.

10. The system of claim 2 in which said support member includes an RCC.

11. The system of claim 10 in which said RCC is deformable and is fixedly interconnected with said mounting axes.

12. The system of claim 2 in which said means for interconnecting includes a follower on one of said members and a slot in the other for interconnection of said first mounting axes and a follower on one of said members and a slot in the other for interconnection of said second mounting axes.

13. The system of claim 2 in which said support member has coincident first and second mounting axes defining a fixed lateral remote center and said interconnecting means are pivotably connected to said coincident first and second mounting axes on said support member and are fixedly connected to said spaced first and second mounting axes on said operator member.

14. An insertion system including a remote center compliance device and an operator member erection system supported as a part of an intermediate operator member by the remote center compliance device (RCC) and comprising:
   a primary operator member having a longitudinal axis;
   support means for defining a remote center of compliance laterally spaced from said longitudinal axis of said primary operator member and including a support member and means for interconnecting said primary operator member with said support member for enabling said operator member to move about a remote center to vary the orientation of the primary operator member longitudinal axis relative to said support member as said primary operator member moves between an extended and a retracted position for enabling said longitudinal axis of said primary operator member to align in the retracted position with said longitudinal axis of said intermediate operator member and place the remote center of the remote center compliance device (RCC) proximate the tip of said primary operator member.

15. The insertion system of claim 14 in which said primary operator member includes at least first and second spaced mounting axes.

16. The insertion system of claim 15 in which said support member has first and second spaced mounting axes, said means for interconnecting being pivotably connected to said first and second mounting axes on said primary operator and support members.

17. The system of claim 16 in which said first and second mounting axes on said support member are spaced apart a different distance than said first and second mounting axes on said primary operator member.

18. The system of claim 16 in which the interconnection axis of said first mounting axes is non-parallel to the interconnection axis of said second mounting axes and defines a focus where the interconnection axes converge.

19. The system of claim 16 in which said means for interconnecting includes at least a first link for interconnecting said first mounting axes and a second link for interconnecting said second mounting axes.

20. The system of claim 16 in which said means for interconnecting includes a first pair of links for interconnecting said first mounting axes at two spaced points and a second pair of links for interconnecting said second mounting axes at two spaced points.

21. The system of claim 20 in which the interconnecting axes of said first pair of links are non-parallel and generally converge at a focus and the interconnection axes of said second pair of links are non-parallel and generally converge at said focus.

22. The system of claim 15 in which said support means includes an RCC.

23. The system of claim 22 in which said RCC is deformable and is fixedly interconnected with said mounting axes.

24. The system of claim 15 in which said support member has a longitudinal axis and includes first and second stop means for limiting motion of said primary operator member about said lateral remote center between an extended position in which the longitudinal axis of said primary operator member intersects with the longitudinal axis of said support member and a retracted position in which said longitudinal axis of said primary operator member is generally parallel to said longitudinal axis of said support member.

25. The system of claim 15 in which said means for interconnecting includes a follower on one of said members and a slot on the other for interconnection of said first mounting axes and a follower on one of said members and a slot on the other for interconnection of said second mounting axes.

26. The system of claim 15 in which said support member has coincident first and second mounting axes defining a fixed lateral remote center and said interconnecting means are pivotably connected to said coincident first and second mounting axes on said support member and are fixedly connected to said spaced first and second mounting axes on said primary operator member.

27. A method of engaging an operator member, carried by a support member, with a part comprising:
   moving the operator member toward the part with the longitudinal axis of the operator member non-parallel to that of the part;
   engaging the operator member with the part;
   moving the support member toward the part causing the operator member to rotate about a remote center laterally spaced from the longitudinal axis of the support member to erect the operator member with its longitudinal axis generally aligned with that of the part; and
   restricting further rotation of the operator member and fixing it in the erected position engaged with the part.

28. The method of claim 27 in which said support member is carried by an RCC which provides said erected operator member with a remote center of compliance proximate the end of the operator member and further including moving the RCC and support member toward the part to complete engagement.

* * * * *